United States Patent Office 3,209,797
Patented Oct. 5, 1965

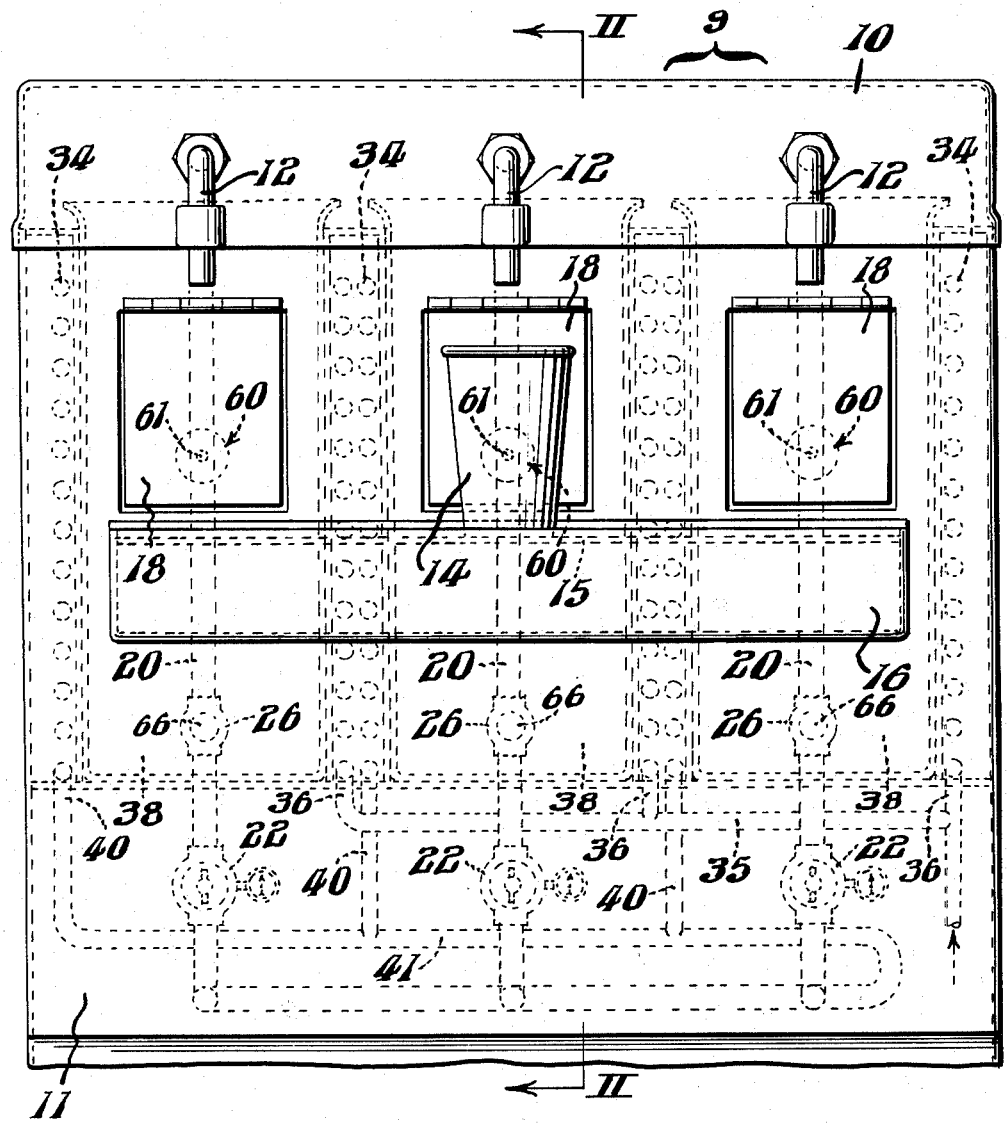

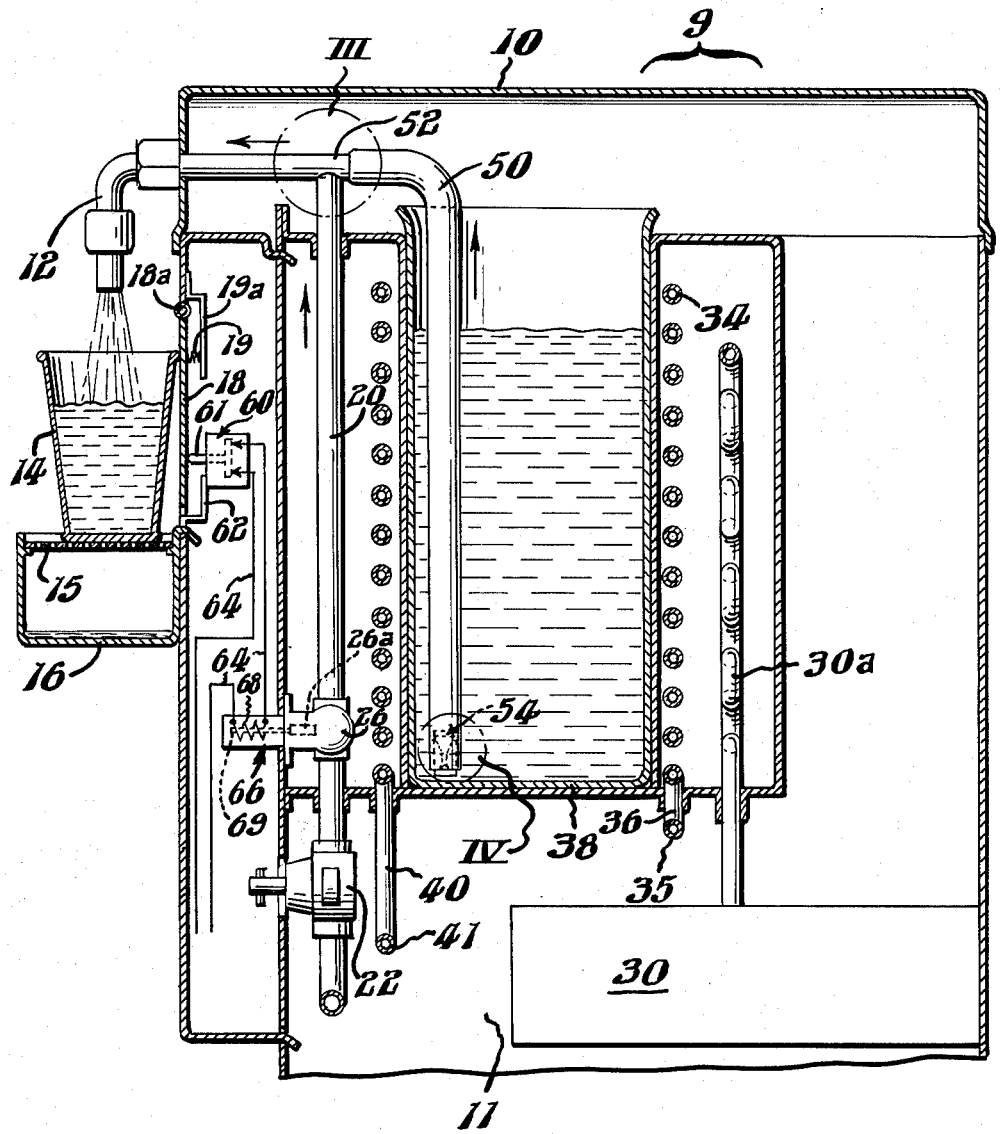

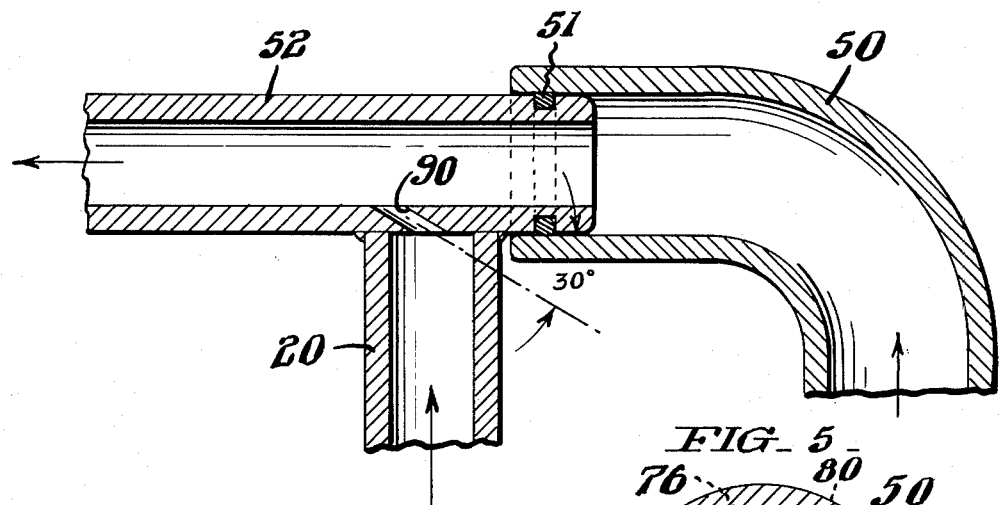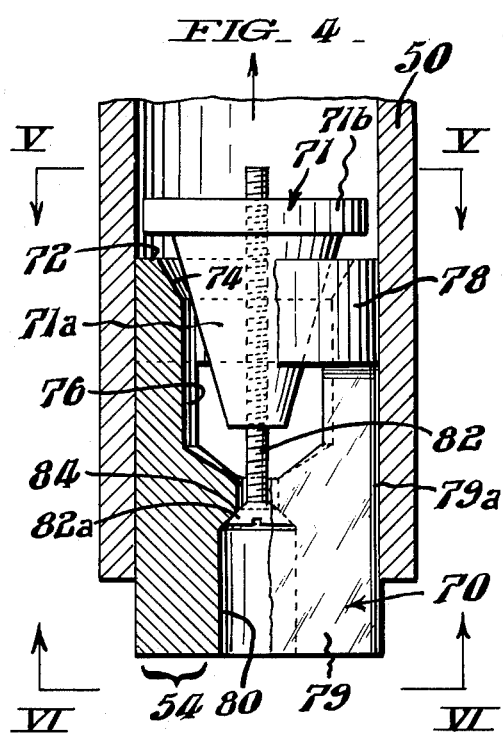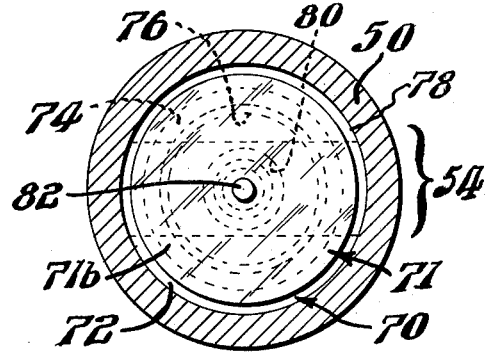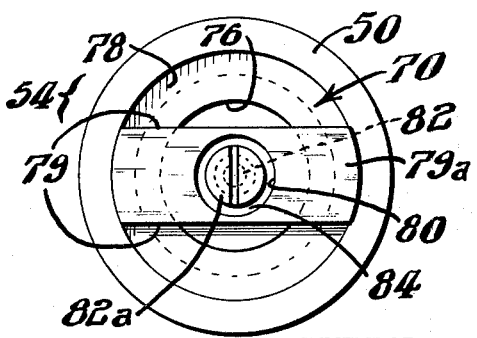

3,209,797
JUICE DISPENSING APPARATUS
Richard J. Marchetti, Norristown, Pa., assignor to Milli Switch Corporation, Gladwyne, Pa., a corporation of Pennsylvania
Filed Apr. 4, 1963, Ser. No. 270,695
3 Claims. (Cl. 141—362)

This invention relates to a juice dispensing apparatus wherein a beverage concentrate is refrigerated and stored, and is automatically mixed with the correct amount of pure refrigerated water immediately as it is dispensed to the consumer.

It is an object of this invention to provide a simplified juice storage, mixing and dispensing mechanism operating without an elaborate system of pumps and controls so that a flow of the concentrate and its mixing with the water can be simply controlled by the consumer.

It is another object of this invention to provide an apparatus wherein the flow of the juice concentrate is effected by the controlled flow of water under substantially normal tap pressure.

It is an additional object of this invention to provide a dispenser that is very easy and simple to clean.

It is a further object of this invention to provide a simplified, automatic beverage mixing and flow control mechanism whereby the mixed beverage will be discharged into the drinking receptacle when it is placed in position and said flow discontinued upon the cup's removal. These objects and other attendant advantages are more fully described hereinbelow and in the attached drawings wherein:

FIG. 1 is a front elevational view of one form of the dispensing apparatus of this invention showing a single drinking cup in filling position and the water supply pipes and tubes indicated by broken lines;

FIG. 2 is a sectional view of the apparatus taken along the lines and arrows II—II of FIG. 1 showing one form of the internal mechanism of the dispenser in greater detail;

FIG. 3 is an enlarged sectional view of that portion of the apparatus shown in FIG. 2 enclosed in a dot-dash circle and identified by the numeral III;

FIG. 4 is an enlarged sectional view of that portion of the apparatus shown in FIG. 2 enclosed in a dot-dash circle and identified by the numeral IV;

FIG. 5 is a sectional view taken along the lines and arrows V—V of FIG. 4; and

FIG. 6 is a sectional view taken along the lines and arrows VI—VI of FIG. 4.

Although a single form of the dispensing apparatus of this invention is shown in the drawings and described hereinbelow, it is understood that this represents only the preferred form of the invention and that other forms with modifications available to those skilled in the art can be substituted without departing from the teaching of the invention, which is defined in the appended claims.

Referring to FIG. 1 of the drawings, a refrigerated cabinet is provided, generally designated by the numeral 9, wherein a removable lid 10 fits on a main portion 11 providing easy access to the internal mechanism and for filling the concentrate containers as described infra. Positioned at points across the front of the cabinet are three discharge nozzles 12, each arranged for emptying into a drinking cup 14, one of which is shown. Each cup 14 may be placed upon a drain plate 15 forming the top of a trough 16 detachably mounted on the front of the cabinet 9 so that excess beverage flowing from the nozzles is collected in the trough and can be subsequently emptied. A spring-biased, hinged lever 18 is positioned beneath each of the discharge nozzles 12 so that, as a drinking cup is placed against lever 18, said lever is pressed into the cabinet to actuate the dispensing apparatus automatically, as will be disclosed in further detail hereinafter.

As further shown in broken lines in FIG. 1, each discharge nozzle 12 is connected to a substantially vertically arranged water supply pipe 20, each pipe having a pressure regulator 22, together with a solenoid operated valve 26.

Referring to FIG. 2, a refrigerating unit 30 is positioned at the bottom of the cabinet 9 and functions to remove heat from coiled tubing 34 and the juice concentrate reservoirs 38 by means of refrigerant coils 30A.

Ordinary tap water under standard pressure is fed into coil 34 at the lower coil 36 by means of an inlet pipe 35 shown in Fig. 1.

Each receptacle 38 is, of course, removable from the cabinet 9. Coil 34 connects at its other extremity 40 to an outlet pipe 41 and hence, to the vertical water supply pipes 20. A pressure regulator 22 and valve 26 controls the flow of water up pipes 20 and out nozzles 12.

Extending within and adjacent the bottom of the juice receptacle 38 as shown in FIG. 2, is a removable tube or conduit 50 which has an uni-directional flow valve 54 located at its lower extremity. This valve is shown in greater detail in FIG. 4. Conduit 50 at the upper end, is removably connected to a mixing tube 52 which connects therewith by way of gasket 51. Mixing tube 52 connects to nozzle 12 which is also removable.

Referring now to FIG. 3 of the drawings, water supply pipe 20 connects to mixing chamber 52 by means of an angularly arranged jet 90 which has an axis positioned substantially between 25 degrees and 35 degrees away from the longitudinal axis of chamber 52.

It is preferred to provide a ratio of 1:3 to 1:4, for the diameter of the jet 90 to that of the mixing tube 52. It has been found that the velocity of the water passing through jet 90 constructed as described, the water being under normal tap pressure, causes a partial vacuum and suction of sufficient strength within mixing tube 52 so as to draw the juice concentrate up conduit 50 and into tube 52 where the water and concentrate are mixed to optimum proportions The preferred size of the diameter of jet 90, for best operating results with most juice concentrates, is of the order of .063 inch while the internal diameter of the mixing conduit 52 is approximately .213 inch.

Referring now to FIG. 4 of the drawings, the unidirectional valve 54 consists of a movable, frustoconical valve member 71 and stationary seat 70 which has an upper cylindrical portion 78 which fits tightly within conduit 50, as shown also in FIG. 6. Valve seat member 70 has a flattened lower portion 79 providing an opening 79b beneath the valve 71 for flow of juice concentrate into the valve, and also has an annular top flat edge 72 upon which seats the base of flange 71b of valve 71. Conical valve portion 71a fits and moves reciprocally within conical bore 74 and bore 76 of the valve seat member. Ring portion 78 of the valve seat encircles bore 74 and partially that of bore 76 while the remaining portion of the valve seat has two flat sides 79, as shown in greater detail in FIG. 6. Within the substantially rectangular portion 79a of the valve seat, a bore 80 is provided, through which a threaded nut 82 extends into and through, as shown in FIG. 4, the valve 71. When the valve is open, the beveled head 82a of the bolt contacts stop 84 of the valve seat thereby limiting the vertical movement of valve 71. Both the valve and valve seat are preferably formed of a suitable corrosive-resistant material.

As illustrated in FIG. 4, when valve 71 is raised from the valve seat surface 72, it allows a stream of juice concentrate to flow into and through the cylindrical bore 76, passing between the sides of valve portion 71a and the sides of the seat member 70, around the edges of valve flange 71b and up the conduit 50.

The apparatus for automatically controlling the discharge of beverage is described below and reference is made to FIG. 2 of the drawings. The flow of water up pipe 20 is regulated by movement of the diaphragm 26a within valve 26 by means of an electric circuit 64 and switch 60. Each operating lever 18 is supported by a hinge 18a and urged outwardly by means of a spring 19 pressing against a fixed support 19a. Adjacent the bottom of lever 18 and within cabinet 10 is positioned a switch 60 with a plunger 61 mounted on support 62 having connecting electric wires 64 extending to a power source (not shown) and to a solenoid 66. As diagrammatically illustrated in FIG. 2, the solenoid 66 consists of a coil 68 surrounding a movable core 69 connected to the diaphragm 26a within valve 26. As illustrated, by pressing lever 18 against switch 60 and closing the circuit, the solenoid acts to withdraw the valve diaphragm allowing water to flow up pipe 20. Upon removal of lever 18 from switch 60, the solenoid is no longer charged and the diaphragm, under spring tension, returns to close the valve.

The operation of this form of the juice dispensing apparatus of this invention is substantially as follows. Ordinary tap water is fed into the coil by inlet pipe 35 and cooled by the refrigerating unit. The refrigerant coils, in turn, cool the juice concentrate held in each reservoir. The pressure of the water flowing within the supply pipes 20 is regulated by the pressure regulators 22. When juice is desired, a cup is placed beneath the selected nozzle, pressing lever 18 against switch 60 causing valve 26 to open. Cold water flows up pipe 20, through jet 90 and into mixing tube 52, thereby creating a suction and drawing juice concentrate in a predetermined proportion up conduit 50 into the same mixing chamber. Valve 54 is lifted into the open position by the upward flow of juice concentrate. The velocity of the water passing out jet 90 causes the water to mix with the concentrate before it is discharged out of nozzle 12. After the drinking cup is filled it is removed allowing lever 18 to move away from switch 60, causing valve 26 to close and thereby preventing the further flow of liquid. Valve 54 seats by gravity, preventing the concentrate from flowing down conduit 50. The concentrate is thereby held near the top of conduit 50 and in position for further mixing.

The apparatus described hereinabove provides for the efficient refrigerating, mixing and automatic discharge of a selected beverage by the simple act of placing a cup beneath the chosen nozzle. There is no requirement for pumps and other complicated control devices to mix and discharge the beverage and thereby considerable saving in cost and maintenance is achieved. The structure of valve 54 provides uniformly effective seating notwithstanding the presence of pulp and other natural solids in the concentrate.

Although the preferred form of the invention is shown and described herein, various modifications can be made therein, including the substitution of equivalents, reversals of parts, and the use of certain features without the use of others. All such modifications are within the spirit and scope of this invention as defined in the appended claims.

Having thus described my invention, I claim:

1. A juice mixing and dispensing apparatus comprising a removable reservoir for juice concentrate,
a displaceable concentrate supply conduit having a horizontal portion and a vertical portion, the latter portion extending downwardly into said reservoir, said conduit having uni-directional valve means mounted adjacent the open end of the vertical portion within the reservoir, said valve means allowing a flow of concentrate into the conduit and preventing a flow out of the conduit,
a substantially horizontal, cylindrically shaped mixing chamber detachably connected to the horizontal portion of the supply conduit,
a discharge nozzle connected to the distal end of the mixing chamber,
water supply means connected to the mixing chamber at a position adjacent the connection to the supply conduit,
a restricted passageway of uniform diameter connecting the water supply means and the mixing chamber for causing the mixing of water and concentrate, said passageway being arranged at an angle in the range of 25 to 35 degrees relative to the longitudinal axis of the mixing chamber and the ratio of the dimension of the internal diameter of the restricted opening to that of the mixing chamber at said location being in the range of 1:3 to 1:4, and
a water supply valve and operating means for selectively opening and closing said valve when a drinking receptacle is placed in operative position beneath the discharge nozzle.

2. The apparatus as defined in claim 1 wherein the operating means for the water supply valve includes a displaceable lever mounted beneath the discharge nozzle, a switch, an electric power source and a solenoid connected to the water supply valve whereby upon displacement of the lever by the drinking receptacle the switch connects the source of electrical power to the solenoid to open the water supply valve.

3. The apparatus as defined in claim 2 wherein the uni-directional valve means comprises a conical valve seat, a conical valve member movable toward and away from said seat, an elongated rigid member adjustably fastened to said valve, and stop means connected to said seat and said rigid member providing an adjustable stop for limiting movement of said valve member away from said seat.

References Cited by the Examiner

UNITED STATES PATENTS

| | | | |
|---|---|---|---|
| 2,766,910 | 10/56 | Bauerlein | 222—129.2 |
| 2,895,642 | 7/59 | Bauerlein | 222—129.2 X |
| 3,007,609 | 11/61 | Pascucci | 222—129.2 |
| 3,009,337 | 11/61 | Johnson | 62—390 |
| 3,069,871 | 12/62 | Johnson | 222—129.4 X |

RAPHAEL M. LUPO, *Primary Examiner.*

LOUIS J. DEMBO, *Examiner.*